(12) United States Patent
Schoonmaker et al.

(10) Patent No.: US 11,575,722 B2
(45) Date of Patent: Feb. 7, 2023

(54) SYSTEMS AND METHODS FOR PROVIDING INDIVIDUAL AND/OR SYNCHRONIZED VIRTUAL TOURS THROUGH A REALM FOR A GROUP OF USERS

(71) Applicant: Smarter Systems, Inc., Newton, MA (US)

(72) Inventors: James Schoonmaker, Arlington, MA (US); Matthew Dunn, Marlborough, MA (US); Keno Mullings, Providence, RI (US)

(73) Assignee: Smarter Systems, Inc., Newton, MA (US)

( * ) Notice: Subject to any disclaimer, the term of this patent is extended or adjusted under 35 U.S.C. 154(b) by 0 days.

(21) Appl. No.: 17/501,517

(22) Filed: Oct. 14, 2021

(65) Prior Publication Data

US 2022/0038512 A1 Feb. 3, 2022

Related U.S. Application Data

(63) Continuation of application No. 15/224,077, filed on Jul. 29, 2016, now Pat. No. 11,153,355.

(51) Int. Cl.
*H04L 65/403* (2022.01)
*H04L 65/1093* (2022.01)
(Continued)

(52) U.S. Cl.
CPC ........ *H04L 65/403* (2013.01); *H04L 65/1093* (2013.01); *H04L 67/131* (2022.05);
(Continued)

(58) Field of Classification Search
CPC . H04L 65/403; H04L 65/1093; H04L 67/146; H04L 67/18; H04L 67/34; H04L 67/38; G06Q 30/0613; G06Q 50/16
(Continued)

(56) References Cited

U.S. PATENT DOCUMENTS 8,160,400 B2 4/2012 Snavely
9,014,726 B1 4/2015 Foster
(Continued)

FOREIGN PATENT DOCUMENTS

WO WO2014/087555 A1 6/2014

OTHER PUBLICATIONS

International Searching Authority, International Search Report and Written Opinion for PCT/US2017/044342 dated Sep. 29, 2017 (14 pages).

*Primary Examiner* — Nicholas R Taylor
*Assistant Examiner* — Chong G Kim
(74) *Attorney, Agent, or Firm* — Sunstein LLP

(57) ABSTRACT

In accordance with one embodiment of the invention, a method coordinates experiences of a realm for a group of users, including at least an administrative user and at least one participating user. The method includes transmitting, from the server to an administrative user, a session identifier associated with the realm. The method also includes receiving, by the server, a user acceptance to join a session using the session identifier so that the at least one participating user can experience the realm. In response to receiving the acceptance, the method also includes transmitting to a computing device of the participating user, by the server, executable code including data describing a series of locations in the realm. The series of locations comprises at least a first location and a second location, and the first location is associated with a first panoramic image and the second location is associated with a second panoramic image. The executable code is configured to receive instructions from at least one computing device of at least one user within the group to display the realm at at least one selected location, and display, on the computing device, data corresponding to
(Continued)

the realm at at least one of the locations selected by at least one of the users within the group.

15 Claims, 10 Drawing Sheets

(51) Int. Cl.
    *H04L 67/146* (2022.01)
    *H04L 67/00* (2022.01)
    *H04L 67/52* (2022.01)
    *H04L 67/131* (2022.01)
    *G06Q 50/16* (2012.01)
    *G06Q 30/06* (2012.01)
    *G06Q 30/0601* (2023.01)

(52) U.S. Cl.
    CPC ............ *H04L 67/146* (2013.01); *H04L 67/34* (2013.01); *H04L 67/52* (2022.05); *G06Q 30/0613* (2013.01); *G06Q 50/16* (2013.01)

(58) Field of Classification Search
    USPC ........................................................ 709/228
    See application file for complete search history.

(56) References Cited

U.S. PATENT DOCUMENTS

| | | |
|---|---|---|
| 9,244,940 B1 | 1/2016 | Donsbach |
| 9,761,278 B1 | 9/2017 | Turley |
| 2006/0132482 A1 | 6/2006 | Oh |
| 2007/0271338 A1 | 11/2007 | Anschutz |
| 2007/0273758 A1 | 11/2007 | Medoza |
| 2008/0033641 A1 | 2/2008 | Medalia |
| 2008/0126206 A1 | 5/2008 | Jarrell |
| 2008/0143727 A1* | 6/2008 | Oh .......................... G06T 19/20 345/646 |
| 2009/0143977 A1 | 6/2009 | Beletski |
| 2009/0199275 A1 | 8/2009 | Brock |
| 2010/0306671 A1 | 12/2010 | Mattingly et al. |
| 2011/0173565 A1 | 7/2011 | Ofek |
| 2011/0196897 A1 | 8/2011 | Koch |
| 2011/0213549 A1 | 9/2011 | Hallas |
| 2012/0066074 A1 | 3/2012 | Adams |
| 2012/0162253 A1 | 6/2012 | Collins |
| 2013/0012242 A1 | 1/2013 | Nag |
| 2013/0275869 A1 | 10/2013 | Haswell |
| 2013/0321461 A1 | 12/2013 | Filip |
| 2013/0332890 A1 | 12/2013 | Ramic |
| 2014/0047027 A1 | 2/2014 | Moyers |
| 2014/0088861 A1 | 3/2014 | Nash |
| 2014/0189477 A1 | 7/2014 | Weems, III |
| 2014/0280644 A1 | 9/2014 | Cronin |
| 2014/0300775 A1 | 10/2014 | Fan |
| 2014/0304178 A1* | 10/2014 | Bengson ................ H04W 4/021 705/313 |
| 2014/0317511 A1 | 10/2014 | Bailiang |
| 2015/0106364 A1 | 4/2015 | Schpok |
| 2015/0186805 A1 | 7/2015 | Florance |
| 2015/0310596 A1 | 10/2015 | Sheridan |
| 2015/0379040 A1 | 12/2015 | Sheridan |
| 2016/0171011 A1 | 6/2016 | Drogobetski |
| 2016/0210602 A1* | 7/2016 | Siddique ............. G06Q 20/384 |
| 2016/0300387 A1 | 10/2016 | Ziman |
| 2017/0300511 A1 | 10/2017 | Brewington |

* cited by examiner

SYSTEMS AND METHODS FOR PROVIDING INDIVIDUAL AND/OR SYNCHRONIZED VIRTUAL TOURS THROUGH A REALM FOR A GROUP OF USERS

CROSS-REFERENCE TO RELATED APPLICATIONS

This application is a continuation of U.S. patent application Ser. No. 15/224,077, filed Jul. 29, 2016 and issuing as U.S. Pat. No. 11,153,355 on Oct. 19, 2021. The foregoing application is hereby incorporated herein by reference in its entirety.

TECHNICAL FIELD

The present invention relates to providing individual and/or synchronized virtual tours through locations within a realm for a group of users within a networked environment, and more particularly, to allowing users to either select their own locations or rely on other users to select locations for experiencing the realm.

BACKGROUND

Under conventional systems and methods, users examine a realm merely by viewing static images. A user cannot interact with the images, aside from selecting a particular image to view. Furthermore, if the images do not make the relationships between different locations of the realm clear, the user is left to envision how the locations connect to one another. For example, suppose a house hunter views a listing, which provides a group of images for a property. Each image may represent a room from one particular point of view, but the image may nevertheless omit some information about the room, due to the limitations of the camera that captured the image. Additionally, the house hunter may need to switch back and forth between images to determine how rooms relate to one another by, for example, matching features (e.g., picture windows, chandeliers) that appear in multiple images. Moreover, the house hunter may view the images on his or her own. Through conventional methods of experiencing realms, other parties, such as real estate agents, cannot share the house hunter's experience of the realm and cannot control what the house hunter views. In this manner, each individual may have a unique, personal experience of the realm that is not readily communicated with others.

SUMMARY OF THE EMBODIMENTS

In accordance with one embodiment of the invention, a method coordinates experiences of a realm for a group of users, including at least an administrative user and at least one participating user. The method includes transmitting, from the server to an administrative user, a session identifier associated with the realm. The method also includes receiving, by the server, a user acceptance to join a session using the session identifier so that the at least one participating user can experience the realm. In response to receiving the acceptance, the method also includes transmitting to a computing device of the participating user, by the server, executable code including data describing a series of locations in the realm. The series of locations comprises at least a first location and a second location, and the first location is associated with a first panoramic image and the second location is associated with a second panoramic image. The executable code is configured to receive instructions from at least one computing device of at least one user within the group to display the realm at least one selected location, and display, on the computing device, data corresponding to the realm at at least one of the locations selected by at least one of the users within the group.

In some embodiments, the executable code is further configured to receive instructions from the server regarding locations selected by a user within the group. Further, the method may include receiving, by the server from the administrative user, a request to synchronize an experience of the realm for the participating user with an experience of the realm for the administrative user. The request may include a location in the realm selected by the administrative user. The method may include transmitting, by the server, the location in the realm selected by the administrative user to a computing device of the participating user. The location causes the executable code running on the computing device of the participating user to display data corresponding to the location selected by the administrative user.

The method may include transmitting, by the server to a computing device of the participating user, locations in the realm selected by the users of the group. Additionally, the method may include receiving, by the server from the administrative user, a request to synchronize an experience of the realm for the participating user with an experience of the realm for the administrative user. In response to the request from the administrative user, the method may include transmitting, by the server to the computing device of the participating user, an instruction to display data corresponding to the locations in the realm selected by the administrative user.

The computing device of the participating user may create at least one virtual image representing a view of the realm between a location selected by the participating user and the location selected by the administrative user. Also, the computing device may display data corresponding to the virtual image and the location selected by the administrative user to simulate motion in the realm from the location selected by the participating user to the location selected by the administrative user.

The method may include receiving, by the server from the computing device of the administrative user, an updated location selected by the administrative user. The method may also include transmitting, by the server to the computing device of the participating user, the updated selected location so that the computing device of the participating user displays data corresponding to the updated selected location in the realm. In some embodiments, the instruction to synchronize the experiences of the participating user and the administrative user causes the computing device of the participating user to disregard instructions from the participating user.

The method may include receiving, by the server from a first user in the group, a request to synchronize an experience of the realm for a second user in the group with an experience of the realm for the first user. In some embodiments, the selected location in the realm includes a view direction.

The method may include receiving, by the server from an administrative user, a request to view a list of users who have joined the experience of the realm. Also, the method may include transmitting, by the server to a computing device of the administrative user, the list of users for display.

In many embodiments, the method includes receiving, by the server from the administrative user, a request to view a history of selected locations in the realm for a user in the group of users. The method may include transmitting, by the server to a computing device of the administrative user, the history of selected locations in the realm for the user.

The method may include receiving, by the server from the administrative user, a request to follow the view of the participating user. The method may also include sending, by the server to the computing device of the participating user, an instruction to provide, on a continual basis, updates on the location in the realm selected by the participating user. The method may further include forwarding, by the server to the computing device of the administrative user, the updated location selected by the participating user. The updated location causes the executable code running on the computing device of the administrative user to display data corresponding to the realm at the updated selected location of the participating user.

In some embodiments, the method also includes transmitting, by the server to a computing device of the administrative user, locations in the realm selected by the users of the group. The executable code on the computing device of the administrative user may be configured to receive a request to follow the view of the participating user and display data corresponding to the locations in the realm received from the server that are selected by the participating user.

The method may include receiving, by the server from an administrative user, an instruction to display a second realm to the group of users. Additionally, the method may include transmitting, by the server to each computing device for the group of users, executable code including data describing a series of locations in the second realm.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions

A "realm" means a three-dimensional space. Parts of a realm need not be contiguous—realms may include discontinuities. While a realm may represent an actual physical space, any part of a realm may be imaginary.

A "set" includes at least one member.

Systems and Methods for Enabling Shared Experiences of a Realm for Users in a Group The inventors have developed systems and methods that enable users in a group to experience the same realm concurrently, and also to synchronize, either by sharing or commanding and controlling, their experiences of the realm. The systems include a tour platform, with at least one server. The tour platform stores sets of images, each set corresponding to a different realm. A user selects a realm and creates a session for experiencing the realm. When other users join the session, the tour platform transmits code, which includes the set of images for the realm, to the computing devices of the users. The devices store and execute the code, thereby enable the user to interact with the images to experience the realm.

Local execution of the code improves the speed, performance, and overall quality of the user's experiences. Moreover, this local execution enables the tour platform to synchronize experiences of the realm for two or more users efficiently simply by transmitting the locations of interest within the realm to the computing devices of the users, instead of the full images corresponding to the locations. The users' computing devices may process the locations in conjunction with the set of images for the realm to identify the view (e.g., image data) to display to the user. As a result, the systems and methods described herein decrease the likelihood of disruption in a user's experience, due to errors in image data transmission or lapses in connectivity over the network.

Figure 1:
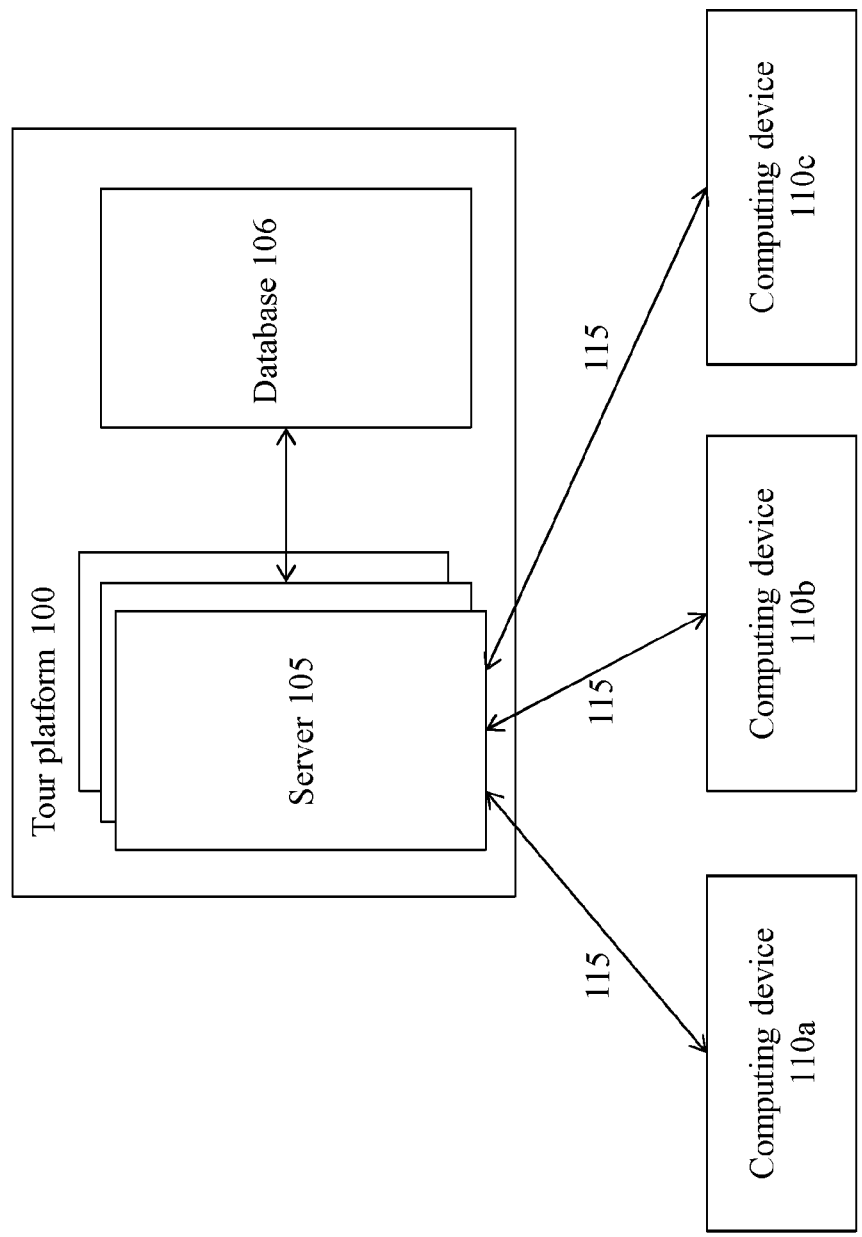
FIG. 1 depicts a block diagram representing a tour platform including at least one server that provides individual and synchronized experiences of a realm for a group of users.

FIG. 1 depicts a block diagram representing a tour platform 100 including at least one server 105 that provides individual and synchronized experiences of a realm for a group of users via each user's respective computing device 110. Although operations described herein are discussed with respect to the server 105, any given operation may be performed by one or more servers in a group of servers.

The server 105 connects to the user's computing devices 110 over a wide area network 115. The server 105 stores sets of images, either on the server 105 itself or on another entity (e.g., another server, a database 106), and each set corresponding to a different realm. The server 105 also stores code that, when executed on a computing device 110, enables a user to interact with a set of images. In various embodiments, from their computing devices 110, users may transmit sets of images corresponding to realms to the server 105 for storage (for the sake of simplicity, user activity discussed herein will be described in reference to the user initiating the activity, even though the user's computing device may perform the activity itself). The set of images may include information such as the relationships between the images and the criteria for switching from one image to another. Furthermore, any given image in the set may have embedded objects, which the user may interact with.

Figure 2A:
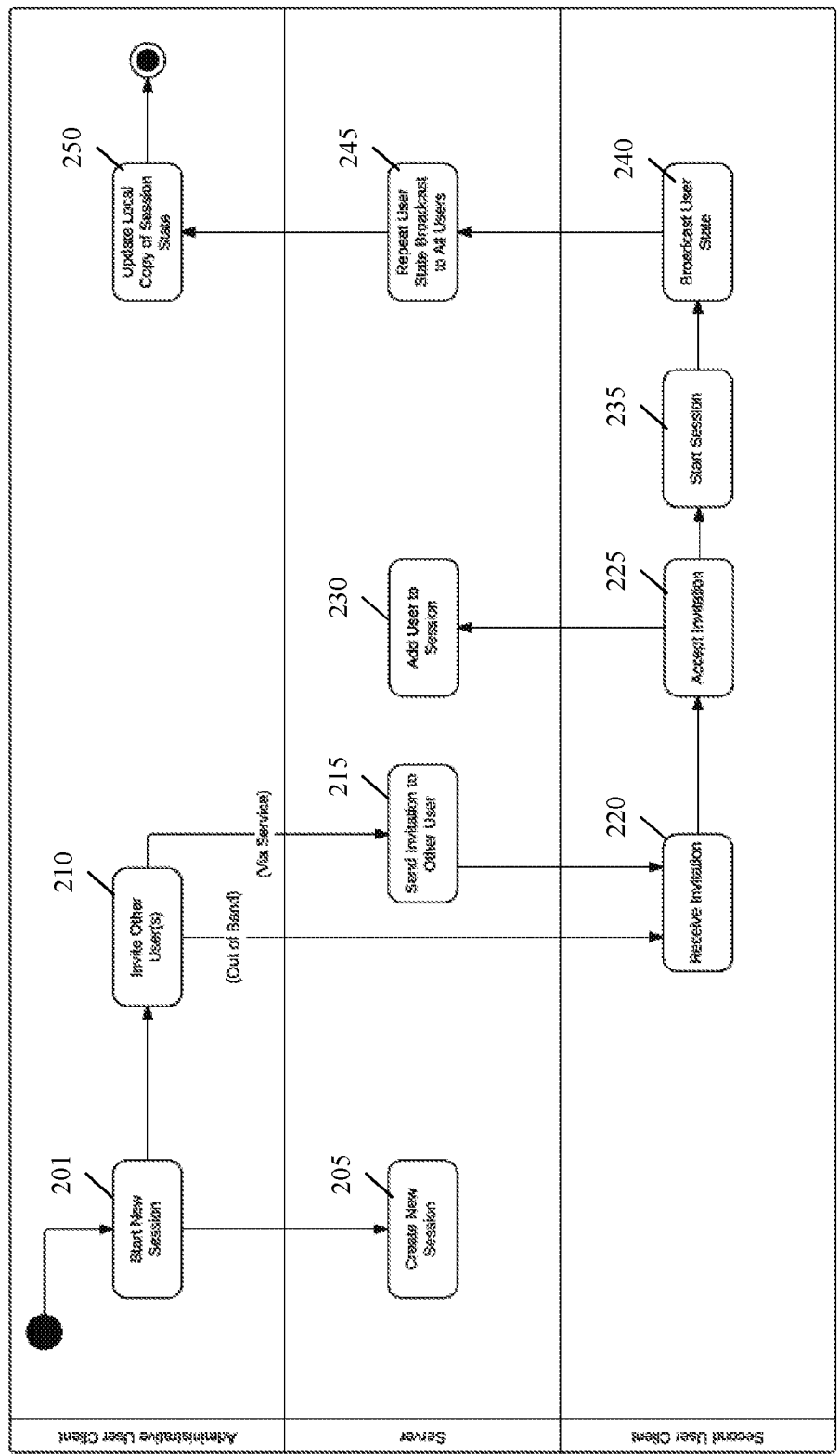
FIG. 2A is an exemplary flow diagram depicting the initiation of a session in which a group of users experience the same realm.

FIG. 2A is an exemplary flow diagram depicting the initiation of a session in which a group of users experience the same realm. A user may send a request to create a session to the server 105 (step 201). The request identifies at least one particular realm to associate with the session, and as the session creator, the user has administrative privileges, described in further detail below (session creators are also referred to herein as "administrative users"). If the request includes more than one realm, the request identifies the first realm for the session. The server 105 creates the session (step 205), and associates the administrative user and the realm(s) with the session.

The administrative user sends invitations to at least one other user to join the session (step 210). The invitations include an identifier for the session, such as an alphanumeric code, and may include a uniform resource location ("URL") for joining the session. In some embodiments, the administrative user sends the invitations to the server 105 (step 215), and the server forwards the invitations to the users (step 220). Alternatively, the administrative user may send the invitations directly to the computing devices of the users (step 220). A user may accept an invitation to join a session (step 225) by, for example, accessing the URL in an invitation, which directs the computing device 110 of the user to the server 105. When the server 105 receives an acceptance of an invitation, the server 105 adds the user to the session (step 230). The server 105 transmits the set(s) of images corresponding to the realm(s) associated with the session to the user, as well as executable code for displaying and interacting with the set(s) of images. The computing device 110 stores the set of images and executable code.

The computing device 110 of the user executes the code to begin the user's experience of the realm (step 235), and to perform any of the steps described herein. In some embodiments, each image in the set of images is a panoramic image. The computing device 110 displays image data from one panoramic image at a time. To provide a more natural experience for the user, the computing device 110 displays only a subset of the panoramic image, which corresponds to the user's view of the represented scene. Thus, any given subset of the panoramic image may be associated with a unique view direction. Whenever the computing device 110 loads a panoramic image from the set, the computing device 110 may initially display the panoramic image from a default view direction. For example, each image in the set may be stored in association with a default view direction. Via the executable code, the computing device 110 identifies a subset of the panoramic image to display, based on the default view direction. Thereafter, the user is allowed to change the view direction. For example, the user may drag the panoramic image to pan to the left or right, or tilt upwards or downwards. In response to the user control, the computing device 110 updates the view direction and the corresponding subset of the panoramic image to display.

Figure 3:
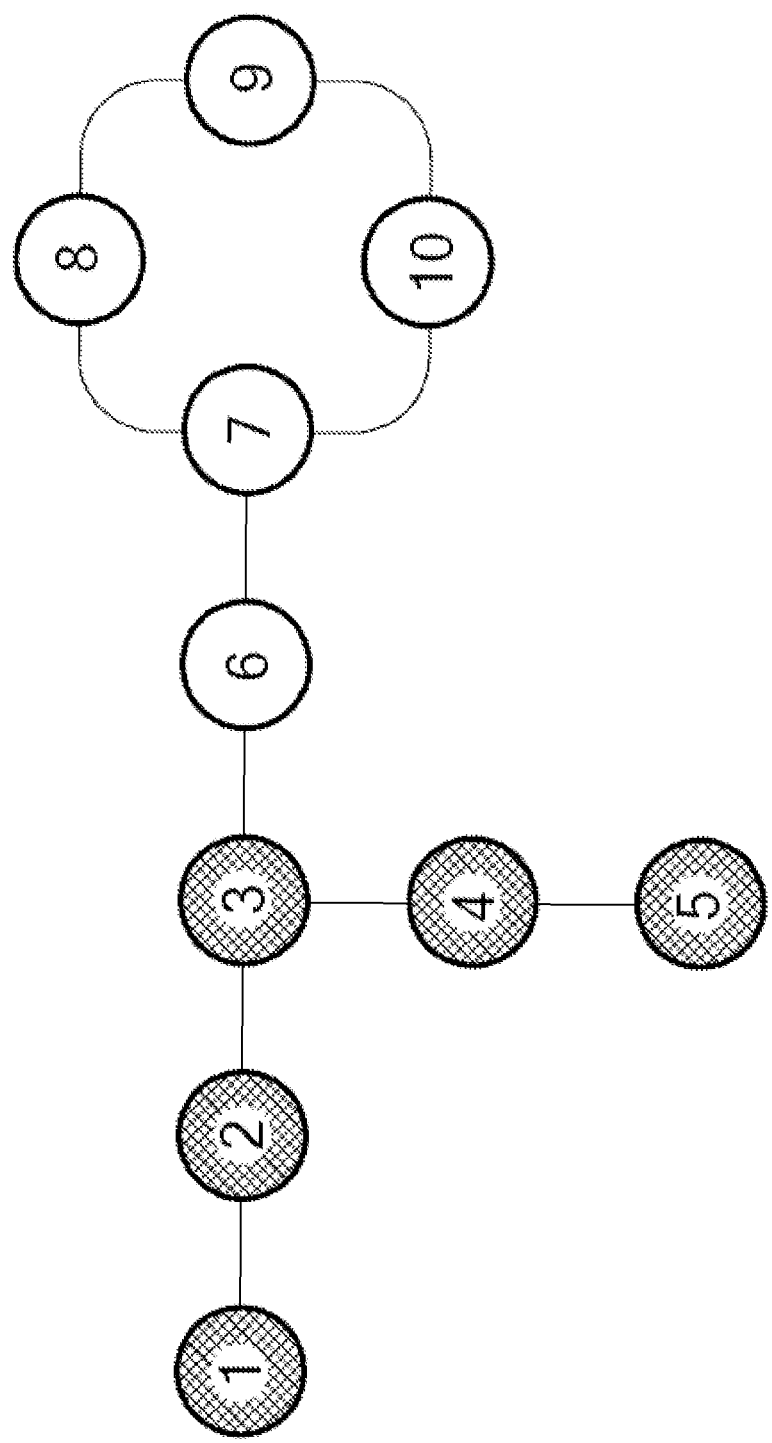
FIG. 3 depicts exemplary relationships between images in a set of images for a realm.

Furthermore, the images in the set may be interrelated in a predetermined manner. Examples of such relationships are depicted in FIG. 3. The relationships constrain the sequence in which the user may view the images for a realm. For example, when the computing device 110 loads the set of images depicted in FIG. 3, the computing device 110 may display the image labeled "1" first. If the user wishes to view another image in the set, the user may only opt for image "2". When the computing device 110 displays image "2", the user is permitted to switch solely to either image "1" or "3".

Should the user traverse the images to select image "7", the user would be permitted to select image "6", "8", or "10" to view.

Moreover, in some embodiments, the user may not be permitted to change images unless the view direction for the displayed image encompasses a pathway between the locations in the realm represented by the displayed image and another image. For example, suppose images "1" and "2" represented adjacent rooms separated by a doorway. When the user is exploring the scene in image "1", to provide a natural experience of the realm, the user is not be permitted to select image "2" unless the view direction for image "1" encompasses the door separating the rooms. In this manner, the user would not be permitted to select image "2" unless the view direction falls within a predetermined range of view directions, during which the door would be visible. In some embodiments, the computing device 100 would not display an icon, such as an arrow, for changing images until the view direction for the displayed image meets this criterion.

When the user sends the computing device 110 an instruction to display another image, the computing device 110 creates and displays transitional images to simulate motion between the locations represented by the two images in the set. Alternatively, the server 105 may create the transitional images and send them to the computing device 110 to display. Exemplary systems and methods for creating transitional images are described in application Ser. No. 11/271,159, which is incorporated by reference in its entirety. The transitional images may represent the pathway between the view direction for the prior image, and a default view direction for the selected image, which may depend on the identity of the prior image. For example, an image may have multiple default view directions, and referring to FIG. 3, image "2" may have one default view direction if a user has selected the image from image "1" and another default view direction if a user has selected the image from image "3". If a user is viewing image "1" and selects image "2", the computing device 110 uses the current view direction for image "1" and the default view direction for image "2" when the user is transitioning from image "1", and creates transition images to simulate motion between the two images.

Furthermore, in some embodiments, the images in the set are not interrelated. Instead, the user may switch from one image in the set to any other image. For example, the user may invoke a control for changing images, and in response, the computing device 110 may display thumbnails representing the images in the set. When the user selects a thumbnail, the computing device 110 may display the corresponding image. In these embodiments, each image may include a default view direction, and the device 110 loads the image data for the default view direction. Because the images are not interrelated, the computing device 110 may switch from one image to another, instead of creating transitional images. Alternatively, the computing device 110 may transition between images by, for example, morphing one image into another. In some embodiments, a user may configure settings provided by the code to select the manner in which the computing device 110 displays images sequentially.

Figure 2B:
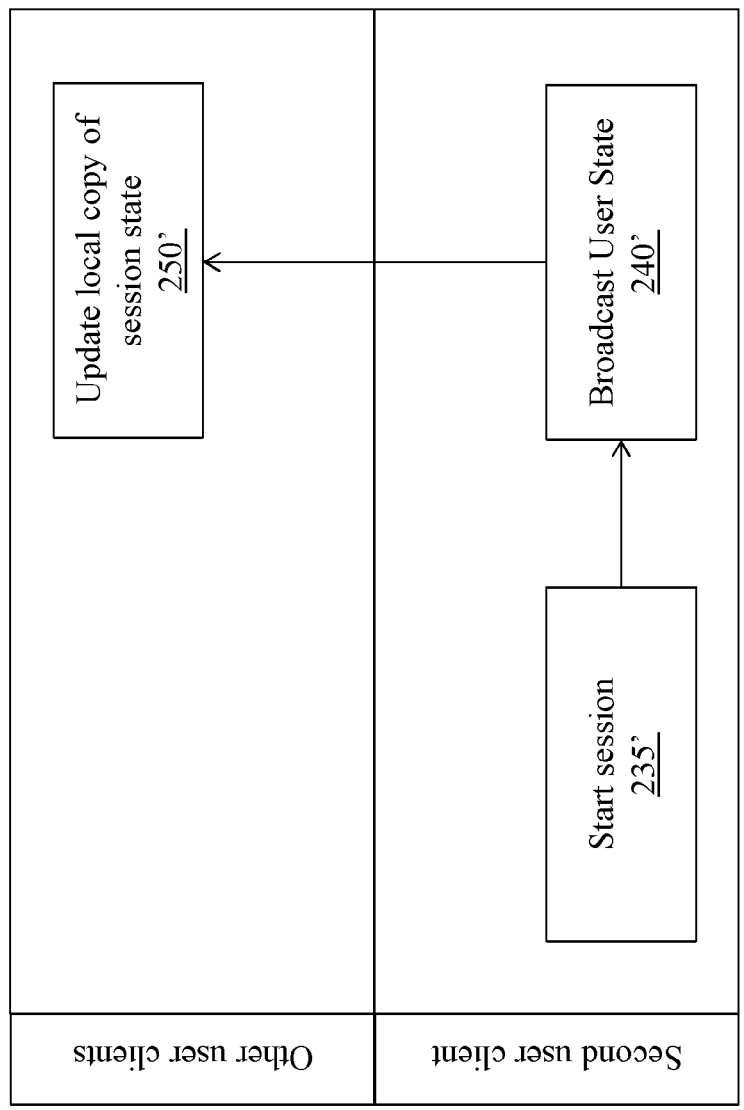
FIG. 2B is an exemplary flow diagram depicting the initiation of the session of FIG. 2A, in which users bypass the server to update one another regarding their locations in the realm.

In various embodiments, as the user interacts with the set of images for the realm, the computing device 110 sends updates about the state of the user's location to the server 105 (step 240). For example, the computing device 110 may update the server 105 regarding the image on display and the view direction therein. Each communication may include an identifier for the session, an identifier for the user (e.g., the user's computing device 110), an identifier for the image in the set that is being viewed, a yaw angle for the view direction, a pitch angle for the view direction, or any combination thereof. Thus, the server 105 receives updated locations in the realm for each user in the session, and the server 105 may store the updates for each user. Alternatively, in this situation and any others in which one computing device 110 sends information to the server 105 for forwarding to other users, the computing device 110 may send updates directly to another user and/or all of the other users in the group. For example, in FIG. 2B, in an alternative embodiment, the computing device 110 sends updates about the state of the user's location directly to the other users in the group (step 240'), thereby bypassing the server 105.

In some embodiments, the server 105 transmits each update from each user to all of the other users in the group (step 245). Alternatively, the server 105 may send updates solely to the administrative user. When the administrative user receives this information, his or her computing device 110 may store the information, thereby saving a history of the users' locations for the session (step 250).

Additionally, the tour platform 100 allows users to synchronize other users' experiences of the realm. In particular, any given user (also referred to herein as the "commanding user") may require another user (also referred to herein as the "following user") to follow his or her experience of the realm. During this period, the computing device 110 of the following user displays the realm according to the location of the commanding user, and in some embodiments, the computing device 110 may become unresponsive to instructions from the following user to select an image or view direction in the realm. In some embodiments, a user may elect to follow the experience of the realm for another user. Thus, the user voluntarily becomes a "following user", but may opt to stop following at any time.

Figure 4A:
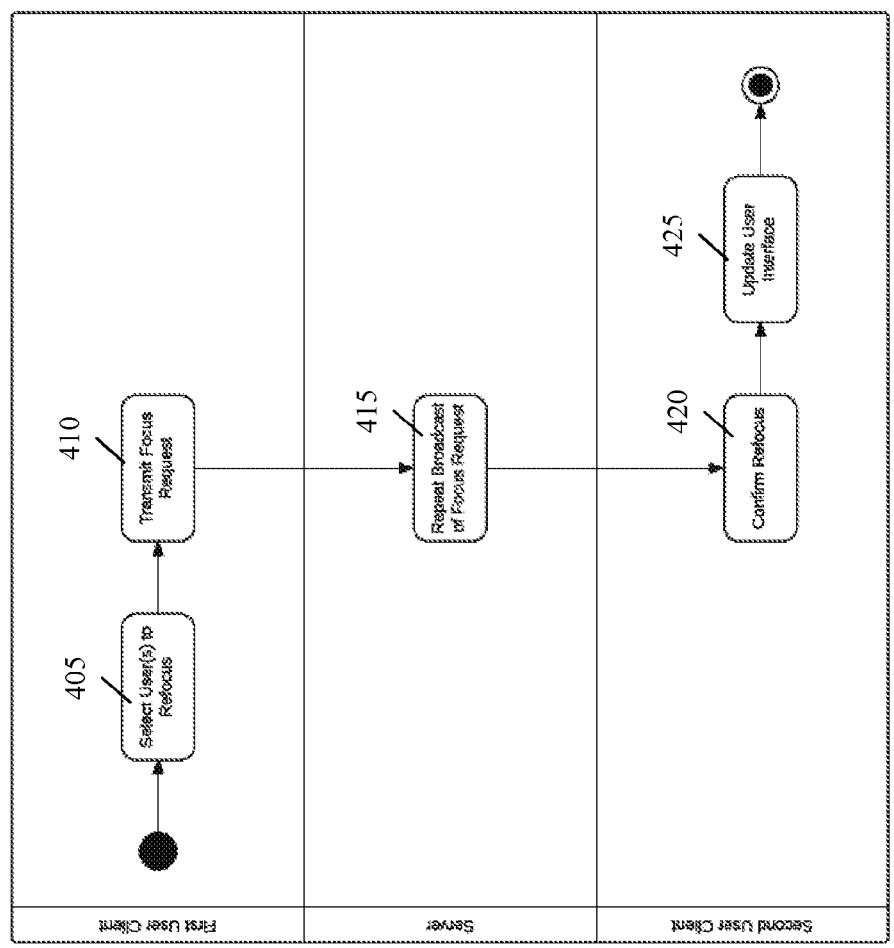
FIG. 4A is an exemplary flow diagram depicting one user commanding and controlling the experience of the realm for another user.
Figure 4B:
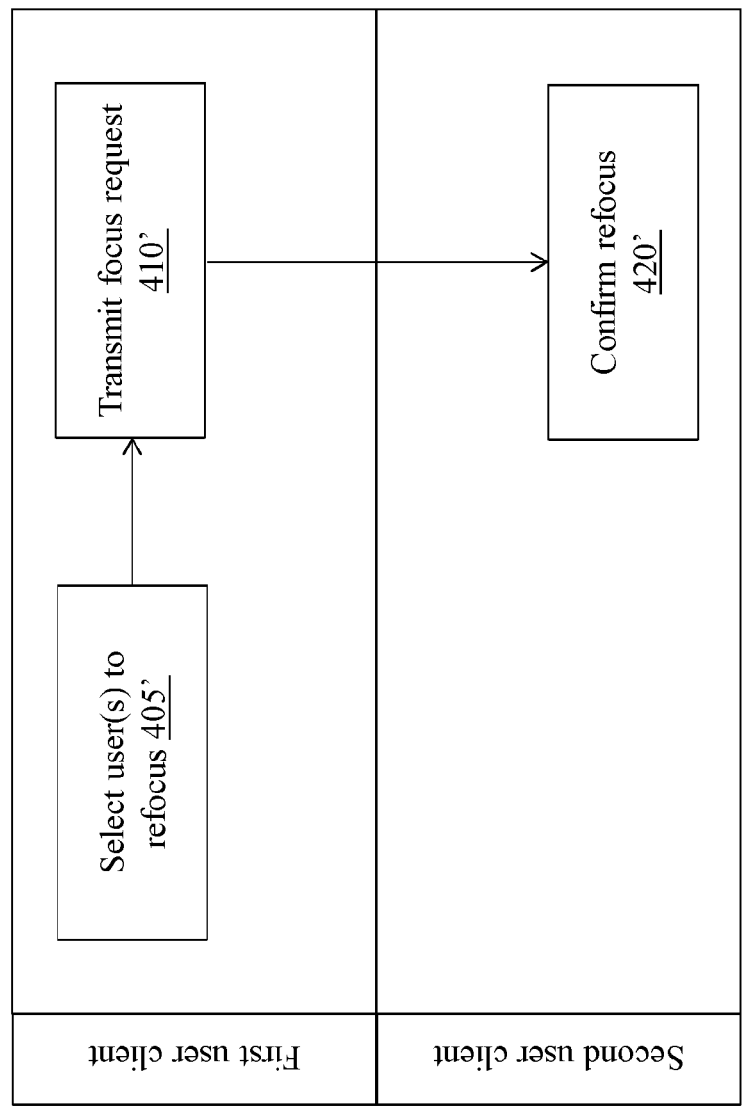
FIG. 4B is an exemplary flow diagram depicting one user bypassing the server to directly command and control the experience of the realm for another user.

FIG. 4A is an exemplary flow diagram depicting one user commanding and controlling the experience of the realm for another user (also referred to herein as "refocusing" another user). On the computing device 110, the commanding user may invoke the option to command and control other users. For example, the computing device 110 may display an icon for commanding and controlling other users' experience, and in response to user selection of this icon, the computing device 110 may display the users in the group for the session. The commanding user may select individuals to be following users (step 405), and transmit an instruction to command and control the experiences of the selected users to the server 105 (step 410). In some embodiments, the administrative user may be allowed to command and control all of the other users in the group, but a non-administrative user may be permitted to command and control a more limited number of users. The server 105 sends instructions to the selected users to follow the commanding user (step 415). In FIG. 4B, in an alternative embodiment, the computing device 110 transmits instructions to command and control directly to the computing devices 110 of the selected users (step 410'), thereby bypassing the server 105.

The computing device 110 of a following user may confirm receipt of the instruction to the server 105 (step 420). At this time, the computing device 110 may display a notification to the following user that he or she is now following the commanding user, and may also begin disregarding any commands that the following user attempts to input (e.g., selection of an image to view, selection of a view direction). The computing device 110 of a following user begins displaying the realm according to the commanding user's experience (step 425).

In some embodiments, the instruction from the server 105 includes a location of the commanding user. In other embodiments, the computing device 110 obtains the location of the commanding user in the course of the commanding user's broadcast of his or her updated location. As described in reference to FIG. 2A, the server 105 may transmit each update from each user to all of the other users in the group (step 245). When a user is not being commanded and controlled by another user, the user's computing device 110 may ignore these updates, or store the updates to create a local copy of the session history. However, when a user is selected as a following user, his or her computing device 110 may begin using the updated information associated with the commanding user to determine the image data in the set of images to display.

Figure 5:
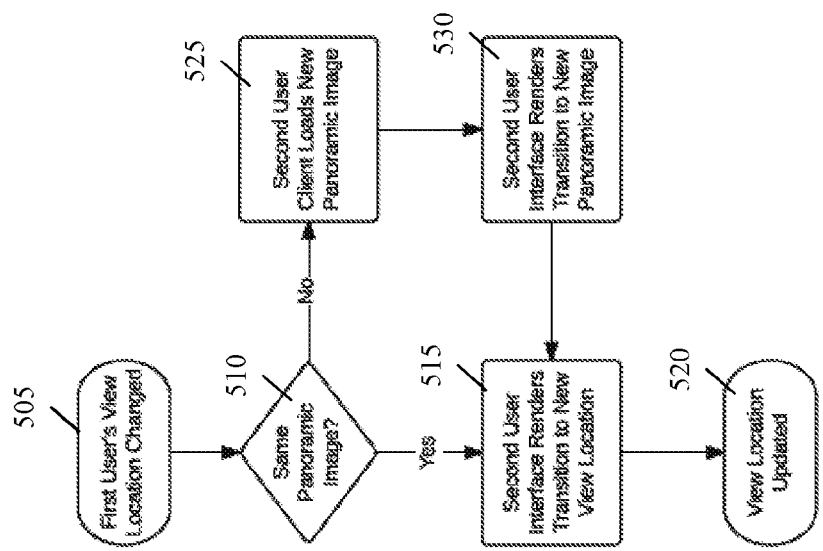
FIG. 5 is an exemplary flow diagram depicting the manner in which the image data for one user is updated, based on the location of another user.

When a user becomes a following user, the computing device 110 may jump to the location of the commanding user directly. Alternatively, the computing device 110 may create transitional images to simulate motion between the following and commanding users' locations. FIG. 5 is an exemplary flow diagram depicting the manner in which a following user's computing device 110 updates the image data that it displays, based on the location of the commanding user. The computing device 110 may execute code to perform these steps when it first begins following the commanding user, and any time the commanding user changes his or her location thereafter.

The computing device 110 of the following user may receive an update to the commanding user's location (step 505) from the server 105. The update may identify an image in the set and a view direction. The computing device 110 compares the image in the update with the image that it is currently displaying. If the images are the same (step 510), using the view direction associated with the image data on display and the newly received view direction, the computing device 110 creates and displays transitional images to simulate motion from the current view direction to the new one (step 515). The computing device 110 displays the image data for the newly received view direction until the device 110 receives another update (step 520).

Alternatively, if the image identified in the update does not match the image currently on display, the computing device 110 retrieves the new image from memory, as well as a default view direction (step 525). If the image has multiple default view directions, the computing device 110 may select the default that is closest to the view direction in the update and display image data associated with this default. The computing device 110 creates and displays transitional images to simulate motion from the default view direction to the view direction in the update (step 530). The computing device 110 displays the image data for the updated view direction until the device 110 receives a further update (step 520).

The computing device 110 of a following user may continue performing the steps in FIG. 5 until the commanding user releases control. While the commanding user compels other users to following his or her experience of the realm, his or her computing device 110 displays an icon for releasing control of other users. If the commanding user selects this icon, the computing device 110 sends an instruction to the server 105 to terminate the control over the other users, and the server 105 forwards the commands to the computing devices 110 of those users.

Upon receipt, a computing device 110 may display a notification to its user that the commanding user has terminated its control. The computing device 110 disregards location updates from the commanding user, and becomes receptive to instructions from the user, again. In some embodiments, the computing device 110 remains at the most recent location selected by the commanding user, and allows the following user to navigate from there. Alternatively, the computing device 110 may have stored the most recently selected location of the following user prior to the instruction to follow the commanding user, and after the commanding user releases control, the computing device 110 restores the selected location of the user.

Although a user may command and control other users' experiences of the realm, in some embodiments, the user may simply share his or her experience, while allowing the other users to retain control. The sharing user may perform similar steps to those described in FIG. 4, but with instructions to share the user's experience with the targeted users. The computing devices 110 of the recipients reserve an area of the display for depicting the experience of the sharing user (e.g., a "picture-in-picture" display), and the devices 110 execute code both for updating the image data displayed in this reserved area, and updating the image data for locations selected by the users. The devices 110 may downsample the images in the set to determine the image data to display for the experience of the sharing user, but process the images received from the server 105 to determine the image data to display for the user of the computing device 110.

Furthermore, a user may opt to follow another user. The computing device 110 may include a control for following a user, and when this control is activated, the device 110 displays a list of users to follow. By selecting a user, the computing device 110 begins displaying image data corresponding to the followed user's location, whether the device 110 receives the location as part of the followed user's broadcast or sends a request to the server 105 to receive the location of the followed user whenever this location is updated. Moreover, the user can opt to either replace the image data on its computing device 110 with the experience of the followed user, or display the experience on a reserved area, thereby viewing different locations in the realm simultaneously. While the user is following another user, the computing device 110 displays an "unfollow" control, whose selection reverts the display data to that chosen by the user.

In some scenarios, the administrative user may wish to select a different realm for the session. For example, the administrative user may be a real estate agent, and upon completing a tour of a property with a client, the real estate agent may wish to show another property. Alternatively, the client may express disinterest with a property, and the parties may select another property to determine if that property will fit the client's needs more appropriately.

Figure 6A:
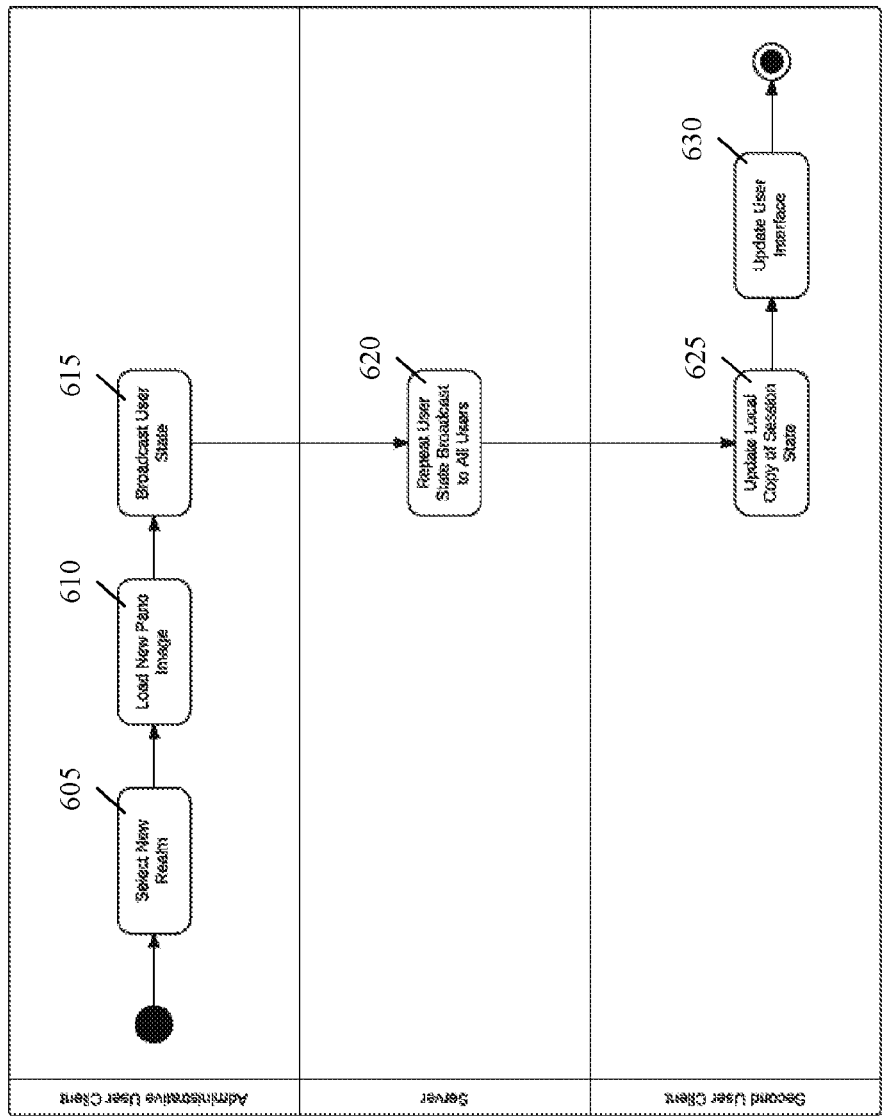
FIG. 6A is an exemplary flow diagram depicting a user's selection of a new realm for a session, and the propagation of that realm to the other users in the group.

FIG. 6A is an exemplary flow diagram depicting the administrative user's selection of a new realm for a session, and the propagation of that realm to the other users in the group. To select a new realm (step 605), the administrative user activates an icon on the computing device 110 to change realms. The computing device 110 displays representations of realms for the session, such as thumbnails of the first images for each of the realms. The administrative user selects one of the realms, and the computing device 110 loads the set of images associated with the selected realm (step 610). The computing device 110 displays the first image in this set, based on the default view position for the image and/or beginning of a tour of the new realm.

Figure 6B:
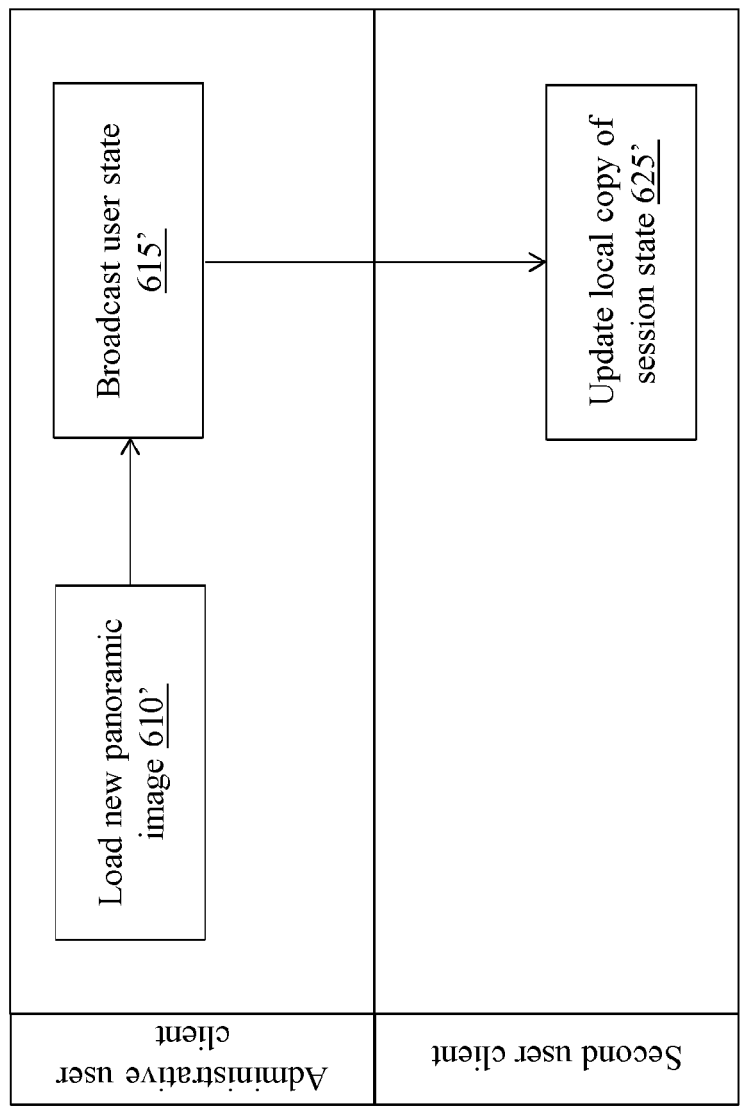
FIG. 6B is an exemplary flow diagram depicting the initiation of the session of FIG. 6A, in which users bypass the server to update one another regarding their locations in the realm.

The computing device 110 sends an update to the server 105 regarding the new realm for the session (step 615). The server 105 sends an update to the other users in the group regarding the new realm for the session (step 620). In FIG. 6B, in an alternative embodiment, the computing device 110 send the update directly to the other users in the group (step 615'), thereby bypassing the server 105. When the other users receive this update, their computing devices 110 process the update (step 625), retrieve the set of images for the new realm from memory, and display the first image in this set (step 630).

Although the figure describes storing the sets of images for realms on computing devices 110 when the users join the session, in alternate embodiments, the users may be informed of realms for the session in real-time, and obtain new sets of images from the server 105 whenever the administrative user selects a new realm for the experience. For example, when the computing devices 110 download the executable code, the code may identify the realms via alphanumeric identifiers, by way of example, but may not contain their sets of images (nevertheless, the code may include the set for the first realm of the session). To retrieve the set of images for a realm, the computing device 110 may send a request with the alphanumeric identifier to the server 105, and in response, the server 105 may return the images. In this manner, the computing devices 110 do not store sets of images for realms until such sets are needed.

Figure 7:
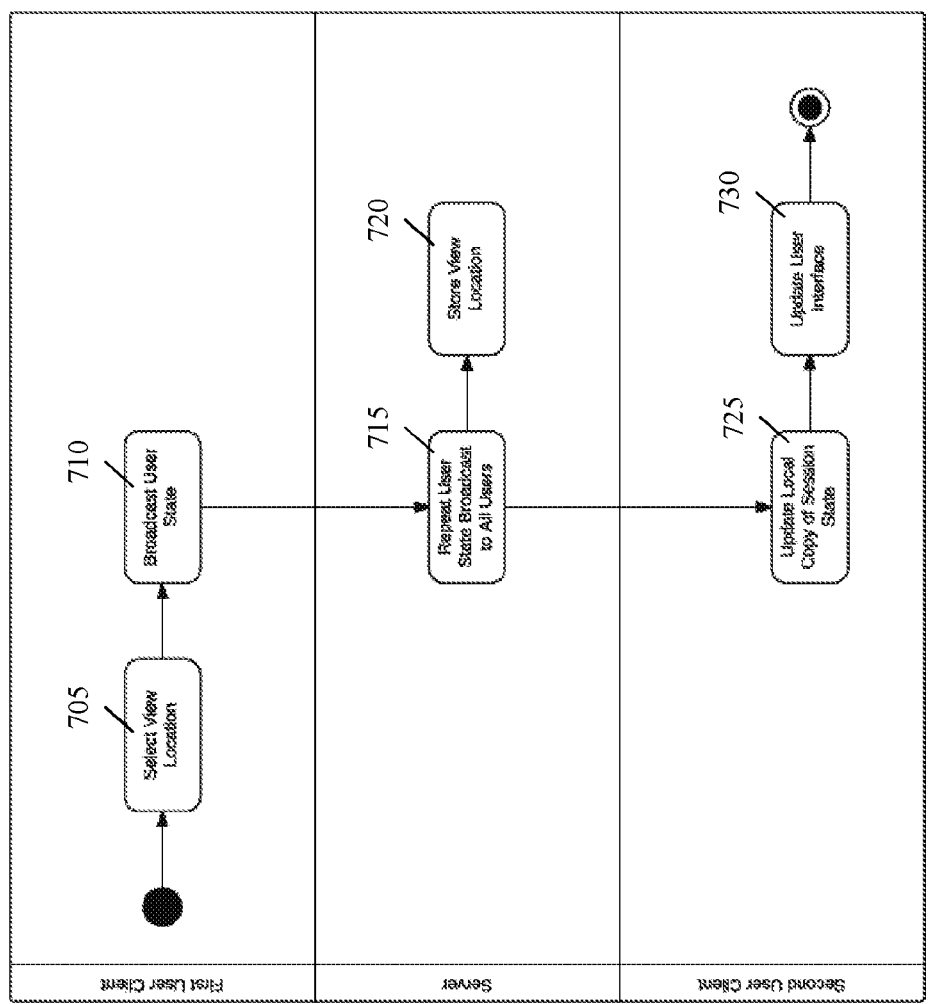
FIG. 7 is an exemplary flow diagram for creating a session history in real time.

Throughout any of these exemplary sessions, the server 105 may store a user history of the session. FIG. 7 is an exemplary flow diagram for creating a session history in real time. The steps are similar to those described in FIG. 4. However, each time a user sends an updated location to the server 105, the server 105 records the change (step 720), and may also store the time that the update was received. In this manner, the server 105 creates a log of every location that each user visited, and the length of time that the user remained at that location. Thus, the server 105 may preserve the history of the session.

After the session ends, the administrative user may run analytics on the session history to ascertain the other users' interests. For example, the administrative user may instruct the server 105 to determine the percentage of time that the users spent in each image, and well as particular sections of each image. If a realm corresponds to a house, analytics may reveal the percentage of time that a user spent in the kitchen, master bedroom, bathroom, and living room. Analytics may also determine that, while the user was in the kitchen, the user spent part of the time examining the appliances, but a significant amount of time enjoying the view into the backyard. Similarly, while the user remained in the basement, the user may have spent little time looking at the heating system, but a significant amount of time looking at the foundation. In this manner, the administrative user may discern items that interest or concern a user based on their location, and select other houses (and realms) accordingly.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of coordinating real-time experiences of a realm among members of a group of users, the group of users including an administrative user and at least one participating user, the method comprising:

transmitting by a server from a computing device of the administrative user, to a computing device of a first participating user of the group, in a real time session that allows the first participating user to experience the realm in real time, (a) data characterizing a series of locations in the realm, the series of locations comprising a first location and a second location, wherein the first location is associated with a first panoramic image and the second location is associated with a second panoramic image, and (b) executable code configured to (1) receive, from the server, an instruction to display, in real-time and during the session, the realm at a location selected by a member of the same group of users other than the first participating user, and (2) display, in real-time and during the session, on the computing device of the first participating user, a portion of a panoramic image corresponding to the realm at the selected location such that the displayed portion is determined by the member of the same group of users other than the first participating user.

2. The method of claim 1, wherein the executable code to receive the instruction to display is further configured to receive the instruction from the server.

3. The method of claim 1, further comprising:
receiving, by the server from the computing device of the administrative user, a request to synchronize an experience of the realm for the first participating user with an experience of the realm for the administrative user, the request including a location in the realm selected by the administrative user; and
transmitting, by the server to the computing device of the first participating user, the selected location in the realm, the selected location causing the executable code running on the computing device of the first participating user to display a portion of the panoramic image corresponding to the realm at the selected location.

4. The method of claim 1, further comprising:
receiving, by the server from the computing device of the administrative user, a request to synchronize an experience of the realm for the first participating user with an experience of the realm for the administrative user; and
in response to the request from the administrative user, transmitting, by the server to the computing device of the first participating user, a sequence of locations in the realm selected by the administrative user and instructions to display portions of the panoramic images corresponding to the sequence of locations in the realm selected by the administrative user.

5. The method of claim 3, wherein the computing device of the first participating user executes code for
creating at least one virtual image representing a view of the realm between a location selected by the first participating user and the location selected by the administrative user, and
displaying data corresponding to the virtual image and the location selected by the administrative user to simulate motion in the realm from the location selected by the first participating user to the location selected by the administrative user.

6. The method of claim 4, wherein the computing device of the first participating user executes code for
creating at least one virtual image representing a view of the realm between a location selected by the first participating user and a first location in the sequence of locations selected by the administrative user, and
displaying data corresponding to the virtual image and the first location in the sequence of locations selected by the administrative user to simulate motion in the realm from the location selected by the first participating user to the first location selected by the administrative user.

7. The method of claim 3, further comprising:
receiving, by the server from the computing device of the administrative user, an updated location selected by the administrative user; and
transmitting, by the server to the computing device of the first participating user, the updated selected location so that the computing device of the first participating user displays a portion of the panoramic image corresponding to the updated selected location in the realm.

8. The method of claim 3, wherein the instruction to synchronize the experiences of the first participating user and the administrative user causes the computing device of the first participating user to disregard instructions from the first participating user.

9. The method of claim 4, wherein the instruction to synchronize the experiences of the first participating user and the administrative user causes the computing device of the first participating user to disregard instructions from the first participating user.

10. The method of claim 1, further comprising:
receiving, by the server from a computing device of the first participating user in the group, a request to synchronize an experience of the realm for a second participating user in the group with an experience of the realm for the first participating user.

11. The method of claim 1, wherein the selected location in the realm includes a view direction.

12. The method of claim 1, further comprising:
receiving, by the server from the computing device of the administrative user, a request to view a list of users who have joined the session to experience the realm in real-time; and
transmitting, by the server to the computing device of the administrative user, the list of users for display.

13. The method of claim 1, further comprising:
receiving, by the server from the computing device of the administrative user, a request to view a history of selected locations in the realm for a user in the group of users; and
transmitting, by the server to the computing device of the administrative user, the history of selected locations in the realm for the user.

14. The method of claim 1, further comprising:
receiving, by the server from the computing device of the administrative user, a request to follow the view of a participating user;
sending, by the server to the computing device of the participating user, an instruction to provide, on a continual basis, updates on the location in the realm selected by the participating user;
forwarding, by the server to the computing device of the administrative user, the updated location selected by the participating user, the updated location causing the executable code running on the computing device of the administrative user to display a portion of the panoramic image corresponding to the realm at the updated selected location of the participating user.

15. The method of claim 1, further comprising:
receiving, by the server from the computing device of the administrative user, an instruction to display a second realm to the group of users; and
transmitting, by the server to each computing device for the group of users, data characterizing a series of locations in the second realm.

* * * * *